US007631679B1

(12) United States Patent
Hui

(10) Patent No.: US 7,631,679 B1
(45) Date of Patent: Dec. 15, 2009

(54) COMBINATION HOLE PUNCHER WITH CARTRIDGE OF REINFORCERS

(76) Inventor: John Hui, 5 Hutton Centre Dr., Suite 830, Santa Ana, CA (US) 92707

( * ) Notice: Subject to any disclaimer, the term of this patent is extended or adjusted under 35 U.S.C. 154(b) by 219 days.

(21) Appl. No.: 11/598,172

(22) Filed: Nov. 13, 2006

Related U.S. Application Data

(62) Division of application No. 10/937,964, filed on Sep. 10, 2004, now abandoned.

(51) Int. Cl.
*B32B 38/04* (2006.01)
*B32B 37/18* (2006.01)
*B32B 37/12* (2006.01)
*B32B 37/16* (2006.01)

(52) U.S. Cl. ........................ 156/514; 156/513; 156/250; 156/256; 156/261; 156/556; 156/563; 156/564; 156/573

(58) Field of Classification Search ................. 156/250, 156/256, 261, 513, 514, 556, 563, 564, 573
See application file for complete search history.

(56) References Cited

U.S. PATENT DOCUMENTS

| | | | | |
|---|---|---|---|---|
| 1,800,460 | A * | 4/1931 | Maclean | 156/564 |
| 2,353,232 | A | 7/1944 | Greene | |
| 2,441,821 | A | 5/1948 | Kendell | |
| 2,512,822 | A * | 6/1950 | Barsh | 493/347 |
| 2,561,387 | A | 7/1951 | Forese | |
| 2,583,944 | A | 1/1952 | Hirszson et al. | |
| D193,231 | S | 7/1962 | Klein | |
| 3,898,919 | A | 8/1975 | Grimaldi, Jr. | |
| 3,925,144 | A | 12/1975 | Lowe et al. | |
| 4,007,653 | A | 2/1977 | Cady | |
| 4,072,554 | A | 2/1978 | McKibben | |
| 4,289,565 | A | 9/1981 | Wilkins | |
| 4,310,379 | A | 1/1982 | Harrison | |
| 4,713,995 | A | 12/1987 | Davi | |
| 4,746,394 | A | 5/1988 | Sueta et al. | |
| 4,826,561 | A | 5/1989 | Carroll | |

(Continued)

FOREIGN PATENT DOCUMENTS

WO PCT/FR88/00134 3/1988

*Primary Examiner*—Mark A Osele
*Assistant Examiner*—Christopher C Caillouet
(74) *Attorney, Agent, or Firm*—Cislo & Thomas, LLP

(57) ABSTRACT

A hole puncher and reinforcer for punching holes in sheets of material and for concurrently applying reinforcement to the sheets of material about the holes punched employs a removable cartridge containing a punch rod upon which a supply of reinforcement rings is mounted. The cartridge fits into a tubular socket located on the stanchion of the puncher and reinforcer frame. The reinforcing rings are mounted on the lower end of a cylindrical punch rod and a pressure plate attached to the punch rod forcefully presses each reinforcing ring in turn against a sheet of material as the cutting edge of the punch rod concurrently punches a hole in the sheet of material. When the supply of reinforcing rings is depleted, the entire cartridge is removed by rotating the punch lever arm away from alignment with the punch rod. A hook on the underside of the punch lever arm engages a lug on the cartridge, and lifts the cartridge out of the socket stanchion to facilitate removal and replacement of the cartridge. A fresh cartridge, preloaded with a new punch and a supply of reinforcing rings can then be dropped into the socket on the punching mechanism stanchion.

5 Claims, 11 Drawing Sheets

U.S. PATENT DOCUMENTS

| | | | | |
|---|---|---|---|---|
| 4,909,893 | A | | 3/1990 | Lee |
| 5,188,694 | A | | 2/1993 | Hashida et al. |
| 5,340,229 | A | | 8/1994 | Schwartzman |
| 5,658,421 | A | * | 8/1997 | Carroll ....................... 156/513 |
| 6,206,070 | B1 | * | 3/2001 | Salmon ...................... 156/513 |
| 6,397,652 | B1 | | 6/2002 | Sollami |
| 6,789,593 | B1 | * | 9/2004 | Aono et al. ................. 156/513 |

* cited by examiner

COMBINATION HOLE PUNCHER WITH CARTRIDGE OF REINFORCERS

The present application is a Division of U.S. application Ser. No. 10/937,964 filed Sep. 10, 2004, now abandoned.

BACKGROUND OF THE INVENTION

1. Field of the Invention

The present invention relates to a replaceable cartridge for a combination hole puncher and reinforcer for use in punching holes in sheets of material, such as paper, and for concurrently reinforcing the holes with flat, annular rings around the holes.

2. Description of the Prior Art

In offices throughout the world hole punching devices have been utilized for many years to punch holes in sheets of paper, and sometimes plastic sheets, in order to allow those sheets to be secured in files. Sheets of paper are often punched at the top with a pair of holes that allow them to be secured at the top of files using pronged fasteners. Other types of hole punchers are used to punch holes in papers and other sheets of material along the side margin to allow them to be secured in ring binders or with other attachment devices.

A problem that has persisted through the years is that considerable stress is often applied to the structure of papers fastened in files in the area immediately surrounding the punched holes. The papers then tear through the short distance of material between the holes and the edges of the sheets of paper near which they are formed. When this occurs the sheets will no longer remain in the file.

One system that has been available for many years for remedying this situation is the use of flat, annular reinforcing rings that may be secured to the areas surrounding the punched holes. These reinforcing rings are typically formed of a material of greater strength than the paper or other sheet material in which the holes are punched. The reinforcing rings are coated with either a moisture-sensitive or pressure-sensitive adhesive and are applied to the sheet of paper or other material about holes formed therein once the holes have been punched.

The principal problem with this prior arrangement is that it has historically been performed manually. The task of reinforcing punched holes in the hundreds, and even thousands, of sheets of papers that are secured in files by the manual application of such reinforcing rings is often so labor intensive as to be impractical. Consequently, this system of reinforcement, while used to some extent, is not prevalent.

Various hole puncher and reinforcer devices have been created in attempts to provide alternative, more automated ways of reinforcing the structure of sheets of paper around punched holes therein. Numerous machines have been fabricated that draw segments of adhesive tape from rolls and secure them to sheets of paper or plastic contemporaneously with the perforation of those sheets. When such devices operate properly, the sheets of paper are provided with short sections of tape at the edges of the papers in which the holes are formed. Holes are punched through both the segments of tape and the underlying paper or other sheet material. One recurring problem in such devices is that some of the pressure-sensitive adhesive from the tape transfers to the tape feed and punching mechanisms. This leads to fouling and jamming of the tape advancement and punch apparatus.

An improved hole punching and reinforcing machine was developed and is described in U.S. patent application Ser. No. 10/283,959 filed Oct. 29, 2002, presently pending, and hereby incorporated by reference in its entirety. This improved system involves a hole puncher and reinforcer device that automatically applies a reinforcement about a hole that is punched in a sheet of material, but which avoids the use of adhesive tape drawn from a roll for this purpose. As a consequence, this advanced hole puncher and reinforcer avoids the problem of fouling of a feed system with adhesive transferred to the operating mechanism from a roll of tape.

A further feature of this advanced system is that it is extremely simple in construction. Unlike prior combination hole punchers and reinforcers, the advanced system does not require any elaborate, relatively complex, and expensive tape feed mechanisms. To the contrary, the only mechanism that is required for applying reinforcement about the circumference of the holes as they are punched through the sheet material is a die punch upon which the flat reinforcement rings are stacked one atop another between a broadened punching tip located at the lower extremity of the die punch shank and a pressure plate located above the stack of reinforcement rings.

Despite its advantages, however, the hole puncher and reinforcer of this advanced prior system does have certain disadvantages. Specifically, once all of the reinforcement rings have been dispensed they must be replaced with a new stack of reinforcement rings. This involves detachment of the lower portion of the punch from the upper portion and stringing the replacement rings onto the lower portion of the punch. This is a very tedious and time-consuming process.

SUMMARY OF THE INVENTION

The present invention is an improvement which greatly facilitates the provision of a new supply of reinforcement rings to a hole puncher and reinforcer. According to the present invention a replaceable cartridge is provided having its own punch plate and a punch rod and fully loaded with a fresh stack of reinforcement rings mounted upon the punch rod. The cartridge also contains a spring mechanism that biases the punch rod toward a retracted position within the cartridge casing.

When all of the reinforcement rings have been used up from one cartridge, the spent cartridge, including the punch plate, punch rod, and spring thereon, is removed from the operating mechanism of the hole puncher and reinforcer. A fresh cartridge with a full load of reinforcement rings mounted on a different punch rod is then slipped into position in the frame of the hole puncher and reinforcer. The use of a preloaded cartridge avoids the necessity for reloading the punch with a new supply of reinforcement rings since the supply of replacement rings is already preloaded onto a different punch within the new cartridge. As the supply of reinforcement rings of each cartridge is used up, the entire spent cartridge is easily removed and quickly replaced.

Removal of a spent cartridge is facilitated to an even greater extent by providing an external, lift lug on the casing of each cartridge. The punch lever arm attached to the frame of the hole puncher and reinforcer is configured with a hook. The lift lug and the hook are configured in such a way that they will remain disengaged during normal operation of the hole puncher and reinforcer. However, when a cartridge is to be replaced, the punch lever arm is rotated all the way back, clear of the cartridge. At this extreme position of movement the hook on the punch lever arm engages the lift lug, thereby lifting the cartridge upwardly out of a seating pocket provided on the frame of the hole puncher and reinforcer. The cartridge is thereby self-extracting in nature.

Preferably also the front portion of the cartridge is fabricated from a transparent material, such as clear plastic. This allows the user to see the interior contents of the cartridge and thereby determine approximately how many reinforcement rings remain in the cartridge. The user can thereby be better prepared so as to have a replacement cartridge readily at hand when the reinforcement rings in the cartridge mounted on the hole puncher and reinforcer frame are nearly used up.

Preferably also the cartridge is formed with a casing comprised of a backplate and a hood releaseably engageable with the backplate. The hood and the backplate are provided with engageable snap fitting catches. The construction of the cartridge casing in this manner facilitates installation of the internal components of the cartridge.

The reinforcement rings each have upper and lower surfaces. The lower surfaces of the reinforcement rings are coated with a pressure-sensitive adhesive. Preferably, the upper surfaces of the reinforcement rings are coated with a release coating. The pressure-sensitive adhesive on the underside of each reinforcement ring is strong enough to adhere lightly to the release coated upper surface of the reinforcement ring immediately therebeneath, while the reinforcement rings remain stacked one atop another within the cartridge. However, when the lowermost ring is pressed against a sheet of material, such as paper, it will adhere to the paper as the punch is forced through the paper due to the relatively strong adhesive force between the lowermost ring and the paper. As the punch is retracted the release coating on the top of the lowermost ring breaks the adhesive grip of the pressure-sensitive adhesive from the reinforcement ring immediately above it, and allows all of the remaining reinforcement rings to be withdrawn with the punch.

In one broad aspect the present invention may be considered to be a removable cartridge for a hole puncher and reinforcer. The cartridge is comprised of a hollow casing having a top and bottom, a punch rod mounted to the casing, a spring, a stack of annular reinforcement washers, and a pressure plate. The hollow casing has a punch plate at its bottom and an intermediate partition above its bottom. The punch plate has a punch aperture formed therein. Upper and lower compartments are thereby defined within the casing. The intermediate partition and the punch plate are oriented parallel to each other and have central, coaxially aligned apertures defined therethrough. The punch rod is mounted so as to project out of the top of the casing for reciprocal movement through the partition aperture and through the punch aperture in the punch plate. The spring is located in the upper compartment and biases the punch rod toward the top of the casing.

The reinforcement washers in the stack of annular reinforcement washers all have upper and lower surfaces. They are coated with pressure-sensitive adhesive on their lower surfaces and are coaxially mounted on the punch rod beneath the intermediate partition. The pressure plate is secured to the punch rod for reciprocal movement therewith. The pressure plate is located beneath the intermediate partition and above the stack of reinforcement washers. The aperture in the intermediate partition is smaller in area than the pressure plate. The spring biases the pressure plate toward contact with the intermediate partition.

The casing is preferably formed with a backplate from which the intermediate partition projects forwardly. The casing is preferably formed with a hood releaseably engageable with the backplate. It is advantageous to provide the hood and backplate with mutually engageable snap fitting catches and catch-engaging openings and for the hood to be formed of a transparent material.

In the preferred embodiment of the invention the spring is a compressible coil spring located coaxially about the punch rod. The punch rod has an upper end with a radial, annular groove defined therein. A C-clip washer is provided having an outer diameter greater than that of the spring. The C-clip washer is engaged in the radial, annular groove defined in the upper end of the punch rod. The coil spring is located between and compressible between the intermediate partition and the C-clip washer.

In another broad aspect the invention may be considered to be a removable assembly for use in a commendation hole puncher and reinforcer for punching holes in sheets of material and concurrently applying reinforcement rings to the sheets of material about the holes therein. The removable assembly is comprised of a cartridge casing, a punch rod, a spring, a spring stop, a stack of annular reinforcing rings, and an annular reinforcer pressure plate. The cartridge casing has a top and bottom and a longitudinally extending frame. At least an intermediate partition projects laterally from the frame and has a guide aperture defined therewithin. The cartridge also has a lower punch plate located at the bottom of the frame and oriented parallel to and longitudinally aligned with the intermediate partition. The intermediate partition and the punch plate have mutually coaxially aligned apertures defined therethrough.

The punch rod has upper and lower ends and is mounted in the cartridge casing for reciprocal movement relative thereto within the intermediate partition aperture and into the punch aperture. The spring is located within the cartridge body above the intermediate partition thereof. A spring stop is located at the upper end of the punch rod so that the spring urges the upper end of the punch rod through the top of the cartridge casing.

Each of the annular reinforcing rings has a lower surface with pressure-sensitive adhesive thereon and an opposite upper surface. The reinforcing rings are disposed coaxially about the punch rod and are located within the cartridge casing below the intermediate partition. The annular reinforcer pressure plate is located atop the stack of reinforcing rings and is joined to the punch rod for movement therewith. The aperture through the intermediate partition is large enough to permit passage of the punch rod and small enough to prevent passage of the pressure plate therethrough. If an upper partition is provided, it has an opening therethrough large enough to permit passage of the punch rod therethrough.

In still another aspect the invention may be considered to be a hole puncher and reinforcer for punching holes in sheets of material and for concurrently applying reinforcement to the sheets of material about the holes. The hole puncher and reinforcer is comprised of a base having a flat upper surface with at least one cartridge-receiving depression or pocket defined therein. At least one upright stanchion projects upwardly from the base and forms an edge stop for positioning a sheet of material on the flat upper surface of the base.

A punch lever arm is secured to the stanchion for rotation about an axis of rotation parallel to the flat upper surface. A cartridge is removably attachable to the stanchion and is detachable therefrom. The cartridge includes a hollow casing formed with upper and lower compartments that are longitudinally aligned with each other. The cartridge has a die punch plate formed at its bottom. A die punch opening is formed in the die punch plate. The upper and lower compartments are coaxially aligned with the die punch opening.

A punch rod is mounted to the casing in alignment with the die punch opening for longitudinal, reciprocal movement relative to the casing. The punch rod is mounted for movement within the cartridge and into the die punch opening.

A depression is formed in the flat, upper surface of the base at each stanchion to provide a seating pocket for a cartridge. The depression is configured to receive the punch plate of a cartridge. A spring in the upper cartridge compartment is provided for biasing the punch rod to a raised, retracted position withdrawn from the base. The spring also biases the punch lever arm to a raised position.

A transverse pressure plate is rigidly secured to the punch rod and is located in the lower compartment of the casing. A stack of reinforcing rings is disposed coaxially upon the punch rod beneath the pressure plate. The reinforcing rings have lower surfaces with pressure-sensitive adhesive thereon and opposite, upwardly facing surfaces.

The punch lever arm is rotatable against the bias of the spring toward the base to press a lowermost one of the reinforcing rings forcefully into contact with a sheet of material located atop the base and against the edge stop. The punch lever arm is rotatable downwardly to an orientation intersecting longitudinal alignment with the die punch opening. The punch lever arm concurrently drives the punch rod through the sheet of material and into the die punch opening.

Preferably each stanchion is formed with a tubular socket shaped as a sleeve having a front slotted opening defined therein. The punch lever arm is rotatable clear of alignment with the socket so that the cartridge is insertable into the socket from above to rest and seat within a depression pocket formed in the floor.

Preferably also the cartridge is provided with a laterally projecting lift lug and the punch lever arm is provided with a deflectible hook to engage the lift lug from beneath. Once the cartridge has been inserted into the socket, rotation of the punch lever arm up and away from the base engages the hook with the lift lug to lift the cartridge up from the socket and clear of the depressed pocket in the floor within which it is otherwise seated.

The tubular socket is preferably formed with a longitudinal slot therein. Also, at least the portion of the hollow casing of the cartridge in registration with the slot is formed of a transparent material. This allows a user to view the interior of the cartridge casing to see approximately how many reinforcing rings are left in the cartridge.

The invention may be described with greater clarity and particularity by reference to the accompanying drawings.

DESCRIPTION OF THE EMBODIMENT

Figure 1:
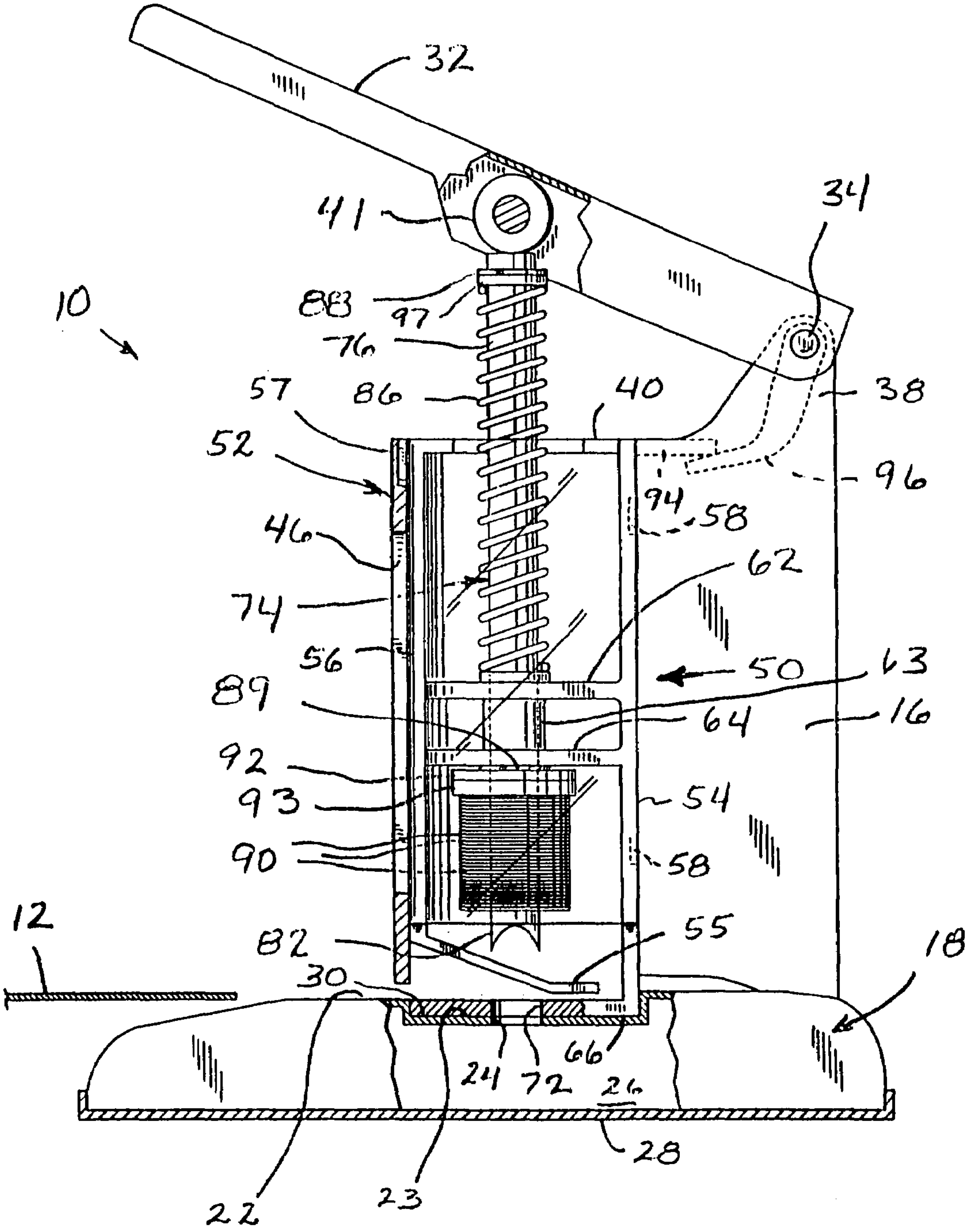
FIG. 1 is a side elevational view, partially broken away, of a hole puncher and reinforcer constructed according to the invention.
Figure 2:
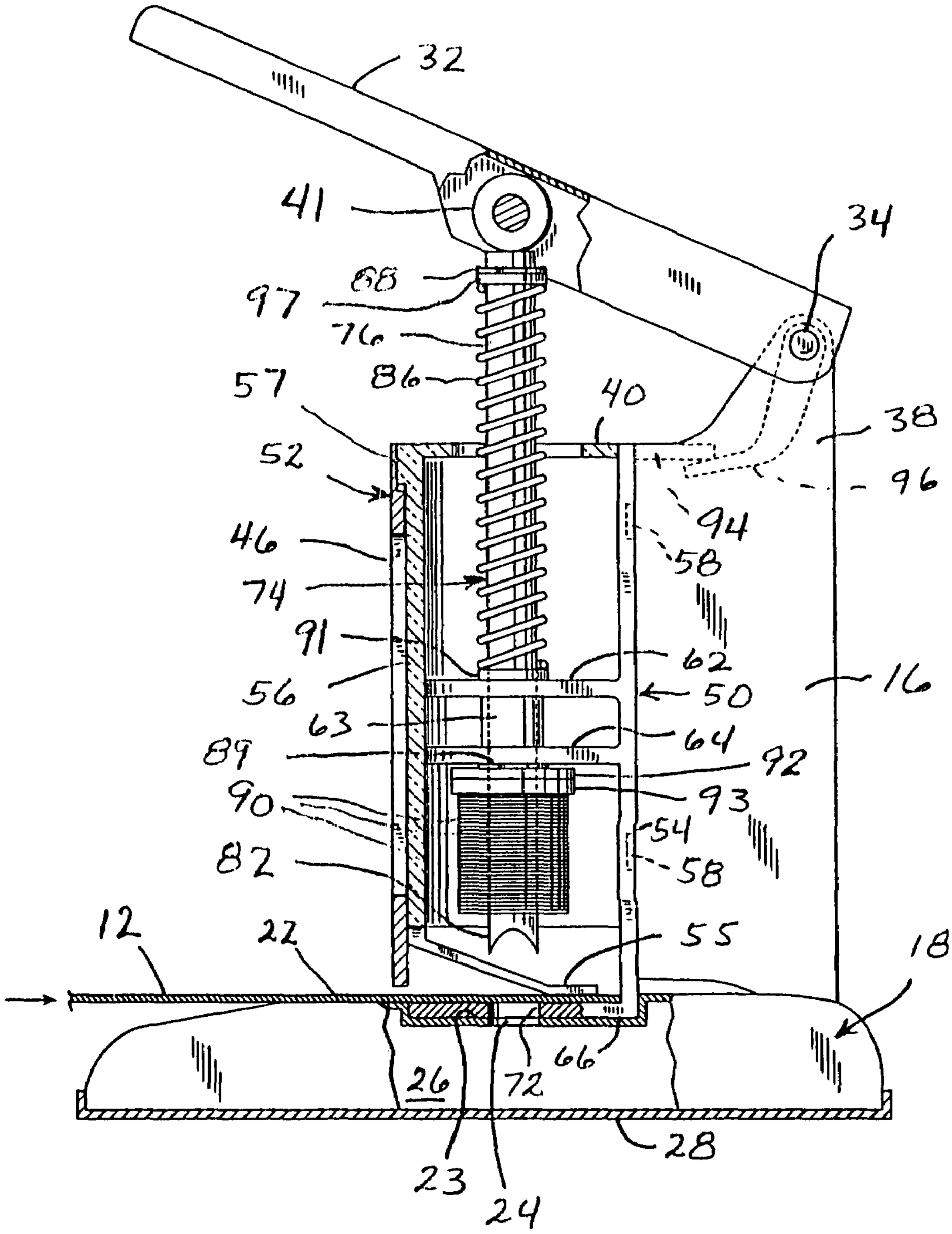
FIG. 2 is another elevational view of the hole puncher and reinforcer of FIG. 1, shown partially in section.
Figure 7:
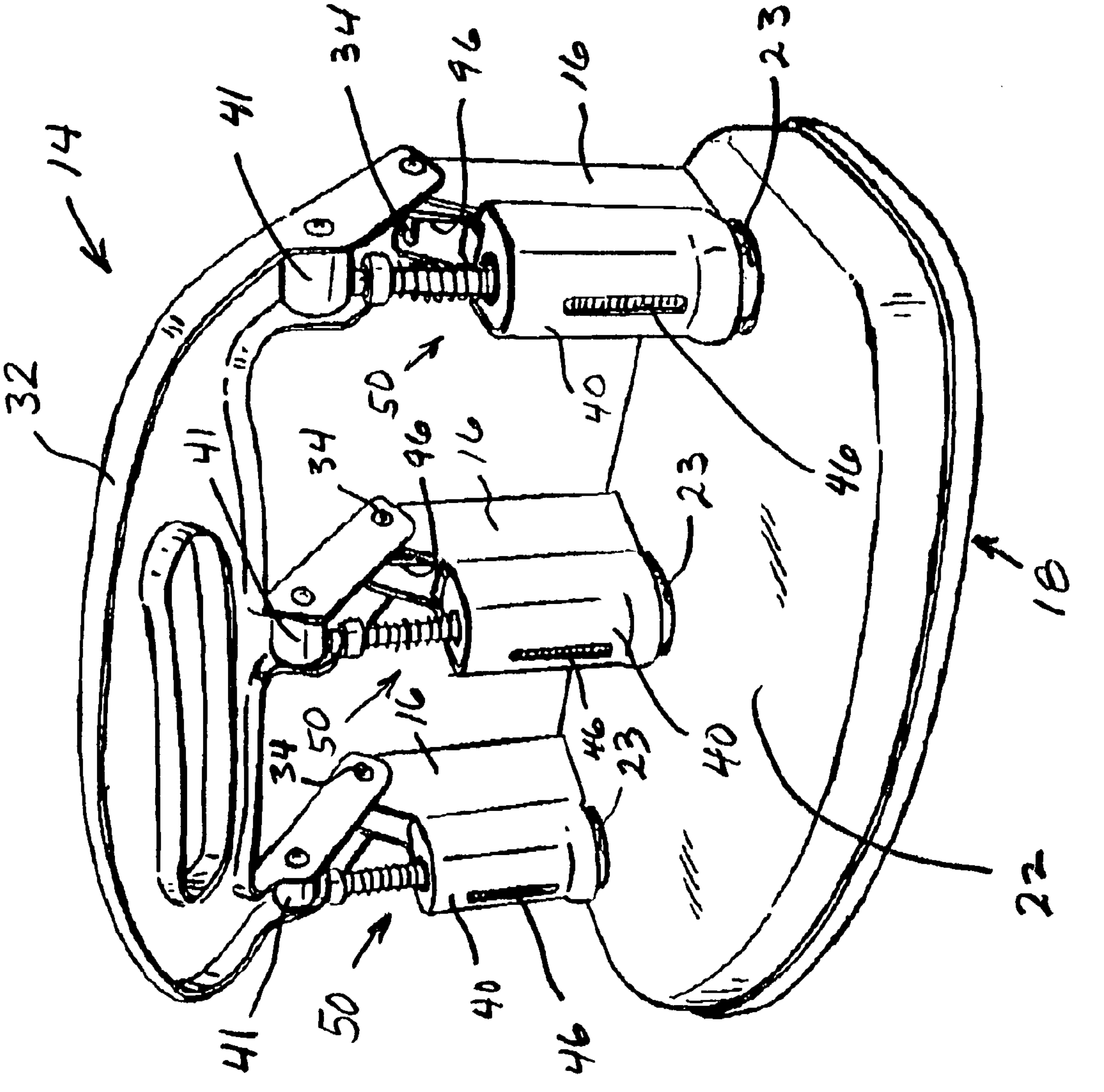
FIG. 7 is a perspective view showing a three-hole puncher and reinforcer according to the invention.
Figure 8:
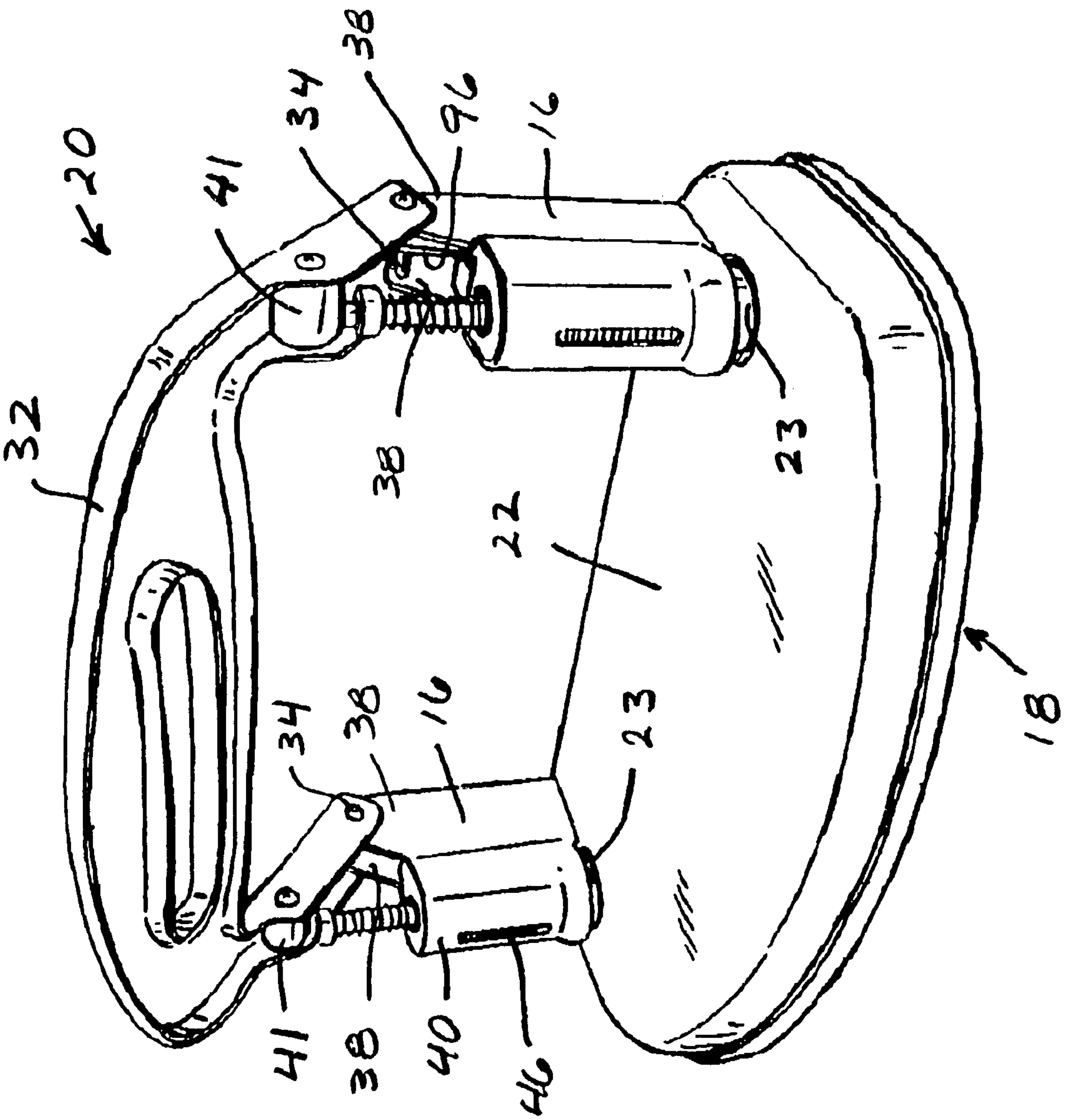
FIG. 8 is a perspective view showing a two-hole puncher and reinforcer according to the invention.

FIGS. 1 and 2 illustrate a hole puncher and reinforcer 10 constructed according to the invention. The hole puncher and reinforcer 10 is operable to punch holes in sheets of material, such as the sheet of paper 12. While the hole puncher and reinforcer 10 could employ a single punch mechanism, more typically it will be constructed to concurrently punch and reinforce a plurality of holes. For example, it may have a plastic or metal framework 14, as illustrated in FIG. 7, suitable for concurrently punching three holes along one side of the sheet of paper 12. In this embodiment the framework 14 of the hole puncher and reinforcer is provided with three identical upright stanchions 16 of identical construction mounted atop a horizontal base 18. Alternatively, the hole puncher and reinforcer of the invention may have a framework 20, as illustrated in FIG. 8, for concurrently punching two holes along the top edge of the sheet of paper 12. In this embodiment the framework 20 has a pair of identical, upright vertical stanchions 16 mounted atop the base 18.

Figure 3:
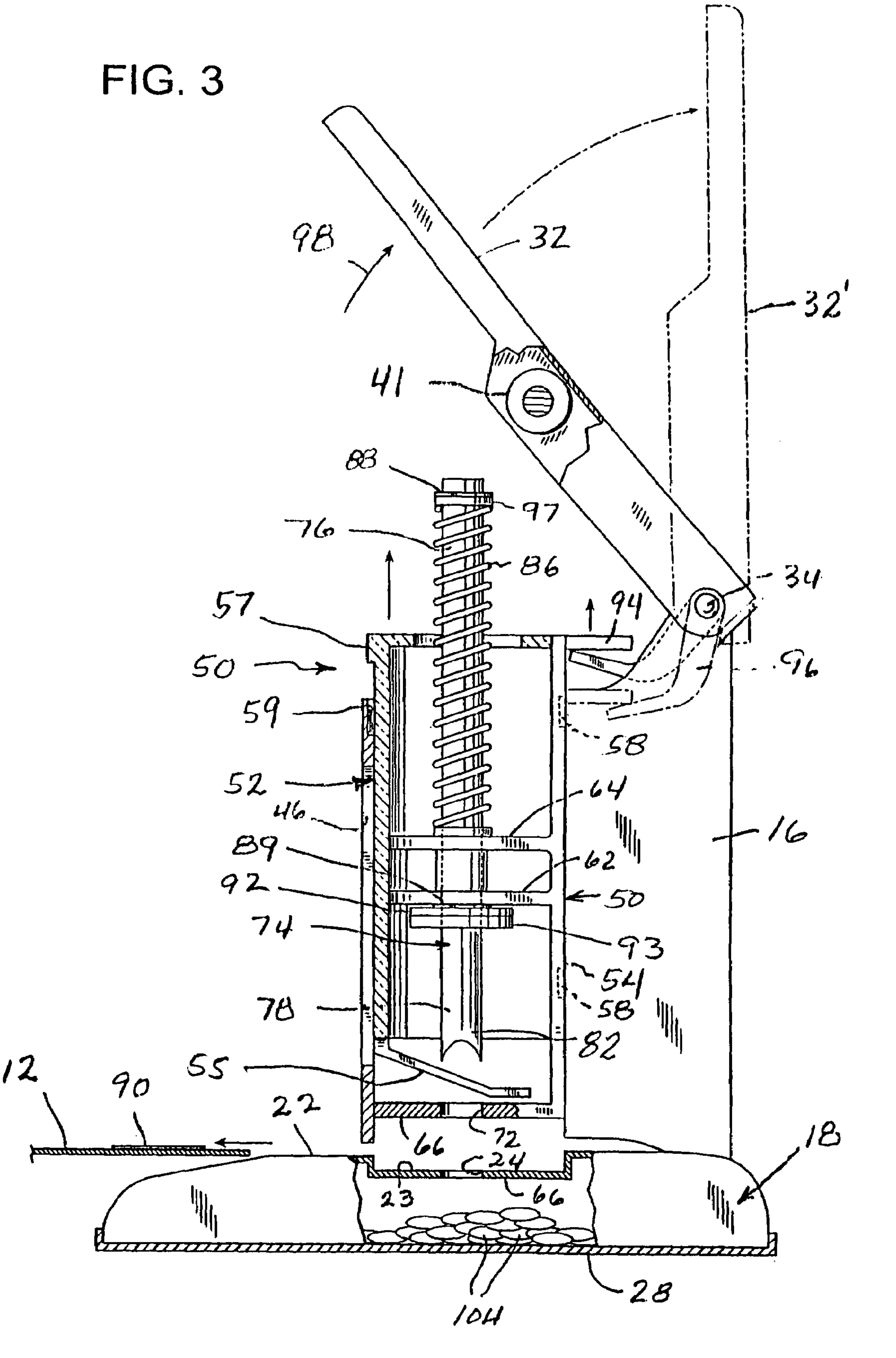
FIG. 3 is a side sectional elevational view illustrating the manner of extraction of a cartridge from the hold puncher and reinforcer.

In all embodiments of the invention the base 18 of the hole puncher and reinforcer has a flat upper surface 22. The base 18 serves as a stabilizing support for one or more upright stanchions 16. A depression is formed immediately in front of each stanchion 16 to create a seating pocket 23. At least one die-receiving opening 24 is defined at the center of each pocket 23, as best illustrated in FIG. 3. The base 18 is hollowed out so as to define a cavity 26 beneath the flat upper deck surface 22 to receive chads 104 of paper punched from sheets of paper 12. As in conventional hole punchers, the bottom of the base 18 is closed by a removable plastic tray 28.

As shown in FIGS. 7 and 8, one or more stanchions 16 projects vertically upwardly from the base 18. A punch lever arm 32 is provided and is secured to all of the stanchions 16 for rotation on axle rod segments 34 about an axis of rotation that is parallel to the flat upper surface 22. Each axle rod segment 34 fits through lever axis apertures defined through ears at the upper extremities of a pair of stanchion plates 38 at the rear of each stanchion 16. The front portion of each stanchion 16 is configured to form a tubular socket 40 which is a sleeve open at both the top and bottom. A closed longitudinal slot 46 is defined down the front of each socket 40.

Figure 2A:
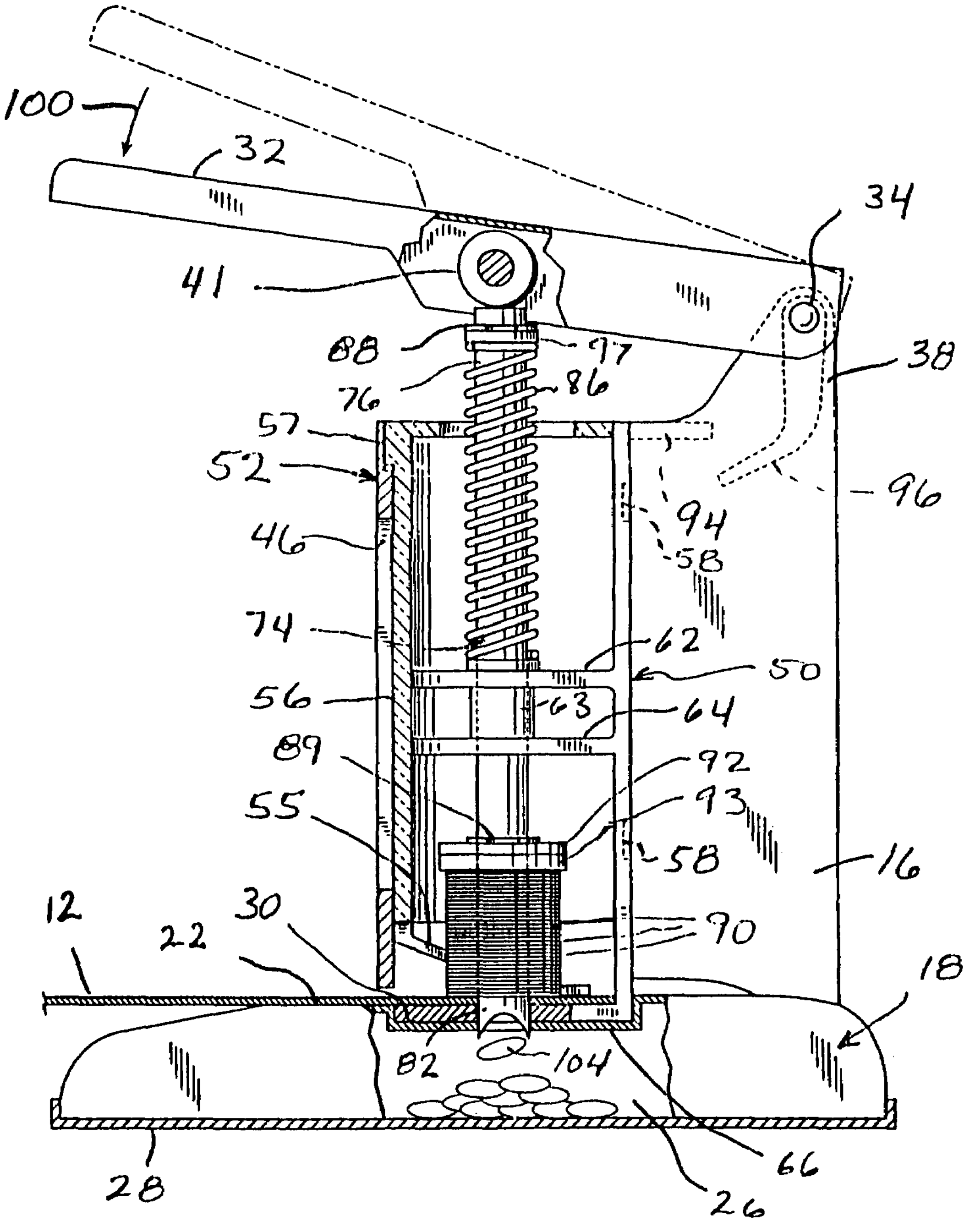
FIG. 2A is a sectional elevational view of the hole puncher and reinforcer of FIG. 2 shown as operated to punch a hole and concurrently apply a reinforcement ring to a sheet of paper.
Figure 2B:
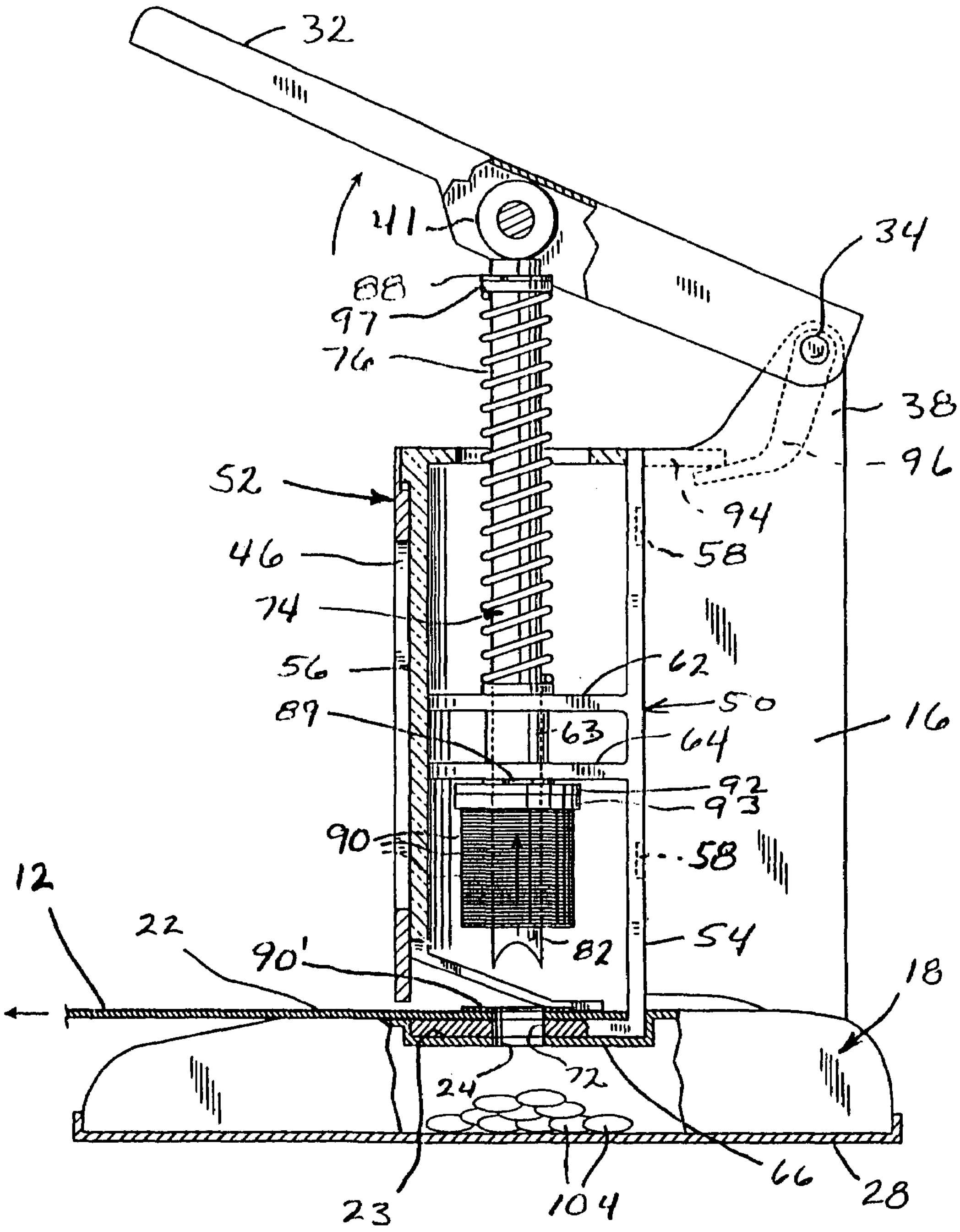
FIG. 2B illustrates the hole puncher and reinforcer returned from the operating position of FIG. 2A to the ready position.

The punch lever arm 32 is secured to the stanchions 16 for rotation about the axle rod segments 34 from a relaxed, slightly raised position, as illustrated in FIGS. 1, 2, and 2B, to the operated position rotated downwardly in a counterclockwise direction 100, as illustrated in FIG. 2A. In its operative positions shown in FIGS. 1-2B, the punch lever arm 32 is oriented so as to intersect vertical, longitudinal alignment with the die-receiving opening 24 in the base 18. However, the punch lever arm 32 may be counterrotated in a clockwise direction 98 to a raised position, clear of alignment with the socket 40. With the punch lever arm 32 in the fully raised position shown in phantom at 32' in FIG. 3 a spent cartridge 50 may be removed and a fresh, prefilled cartridge inserted into the socket 40 from above to rest in the depressed pocket 23 in front of the stanchion 16. A separate roller 41 is mounted for rotation about a horizontal axis on the underside of the lever arm 32 directly above each socket 40.

The cartridge 50 is removably insertable into the socket 40 of any stanchion 16 and is also removable therefrom. The cartridge 50 is illustrated in isolation and in detail in FIGS. 4, 5, 6, and 9.

The cartridge 50 is formed with a casing 52 comprised of a flat, elongated, backplate 54 formed of metal or plastic and having a generally rectangular shape. The casing 52 is also comprised of an elongated hood 56 formed of a transparent or translucent material, such as clear, resilient plastic. The hood 56 has a forwardly directed positioning lug 57 which fits into a corresponding channel 59 in the front of each socket 40. The lug 57 permits longitudinal reciprocal movement of the cartridge 50 relative to the sleeve 40, but restricts rotational movement to ensure that the cartridge 50 seats properly in the pocket 23 in the base 18.

The hood 56 and backplate 54 are provided with mutually engageable snap fitting catches. In the embodiment illustrated the hood 56 is provided with four short corner catch lugs 58 on the inner surfaces of its walls at the edges thereof which are releaseably engageable in correspondingly spaced catch notches 60 on the backside of the backplate 54. The walls of the hood 56 flex sufficiently for the lugs 58 to clear the edges of the backplate 54 and snap into the notches 60.

An upper partition 62, an intermediate partition 64, and a lower partition 66 project perpendicularly out of from the plane of the backplate 54. The upper partition 62 is located at about the middle of the backplate 54 and below the top of the casing 52. The intermediate partition 64 is located a short distance beneath the upper partition 62. The punch plate 66 is located at the bottom of the backplate 54 and at the bottom of the casing 52. The punch plate 66 has a punch aperture 72 defined therein. The forwardly facing surface of the backplate 54 immediately above the punch plate 66 serves as a transverse edge stop at each stanchion 16 for positioning a sheet of paper 12 on the flat upper surface 22. The upper partition 62 and the intermediate partition 64 are located approximately midway between the upper and lower extremities of the backplate 54, thereby dividing the casing 52 into upper and lower compartments.

The partitions 62 and 64 and the punch plate 66 are all oriented parallel to each other and have central, coaxially aligned circular apertures 68, 70, and 72 defined therethrough, respectively. A guide sleeve 63 having a collar at its upper extremity is inserted through the apertures 68 and 70 in the upper and intermediate partitions 62 and 64, respectively. The collar of the sleeve 63 seats upon the upper partition 62. The aperture 72 through the lower partition 66 and the aperture through the sleeve 63 are just large enough to permit the passage therethrough of an elongated punch rod 74.

Figure 4:
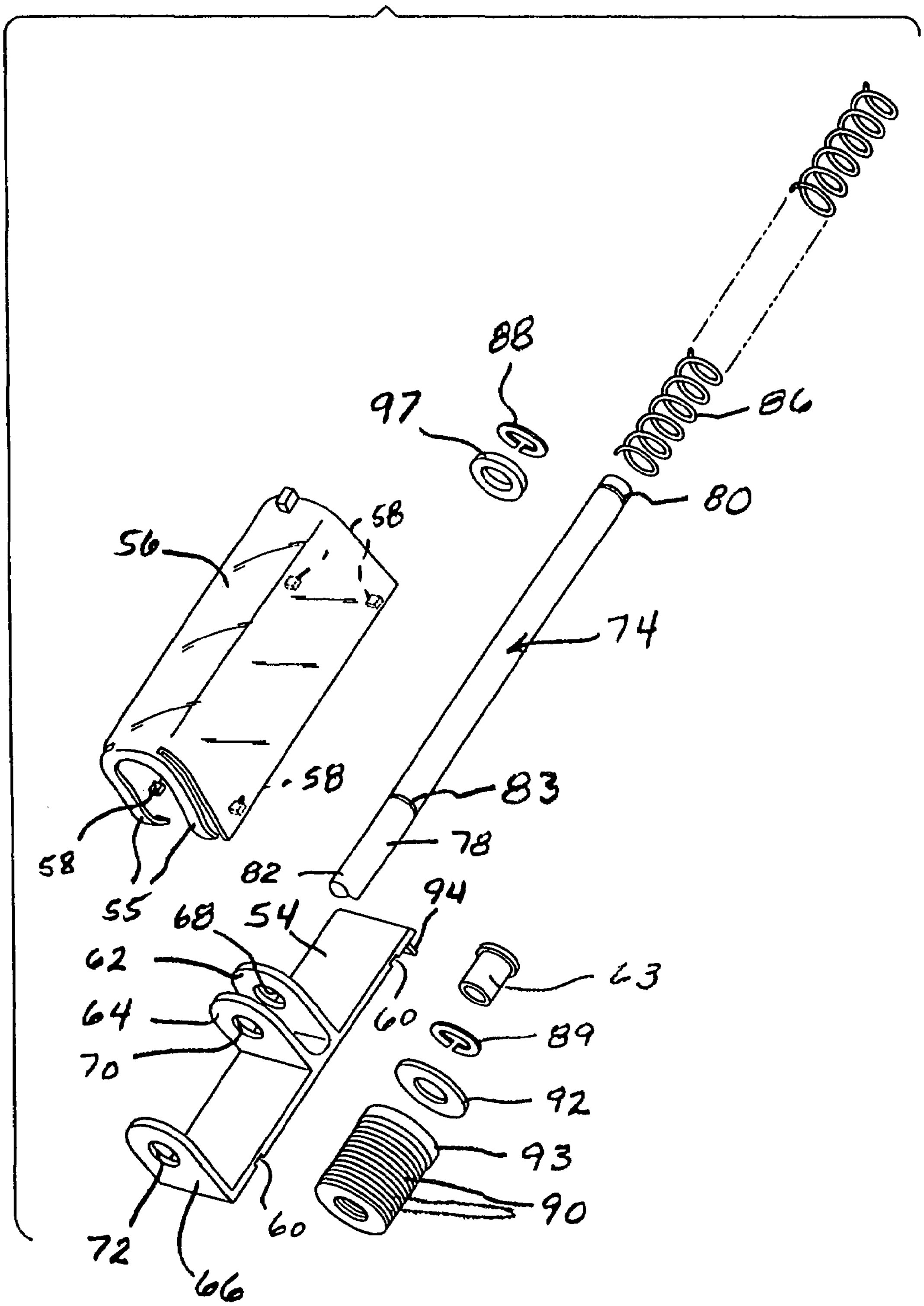
FIG. 4 is an exploded perspective view of the components of the cartridge of the invention, shown in isolation.

The punch rod 74 has an upper end 76 and a lower end 78. A radial, annular groove 80 is defined on the outer, cylindrical surface of the upper end 76 of the punch rod 74, as shown in FIG. 4. A sharp, cutting edge 82 is defined at the tip of the lower end 78 of the punch rod 74. Another radial, annular groove 83 is defined in the outer, cylindrical surface of the lower end 78 of the punch rod 74 some distance above the cutting edge 82.

Figure 5:
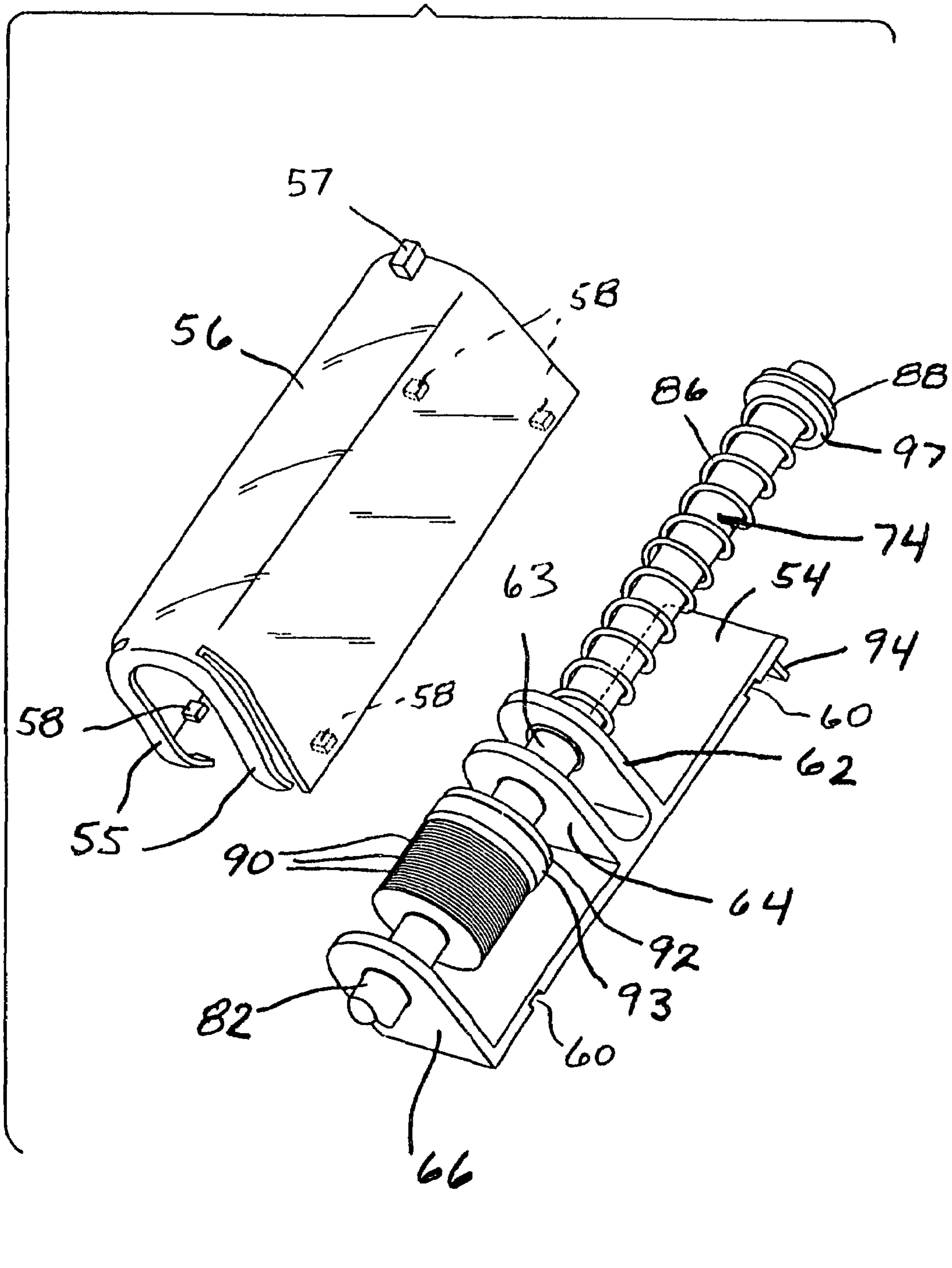
FIG. 5 illustrates the cartridge of FIG. 4 in a partially assembled condition.

As best illustrated in FIGS. 4 and 5, a compressible coil spring 86 is disposed coaxially about the punch rod 74. The coil spring 86 is located in the upper compartment of the casing 52 above the upper partition 62 and intermediate partition 64. A C-clip 88 is provided for engagement in the annular groove 80 in the punch rod 74. The coil spring 86 is compressed between the C-clip 88 and both the upper partition 62 and the intermediate partition 64. A washer 97 is located between the C-clip 88 and the coil spring 86.

The cartridge 50 is provided with a stack of flat, annular disk-shaped reinforcing rings 90 formed of paper or plastic and each having an upper surface and a lower surface. A pressure-sensitive adhesive is applied to the lower surface of each of the reinforcing rings 90, while a release coating is applied to the upper surface of each of the reinforcing rings 90. The reinforcing rings 90 are stacked one above another. A rigid, annular pressure plate 92 formed of steel or hard plastic and having an outer diameter substantially equal to the outer diameter of the reinforcing rings 90 is located atop the uppermost reinforcing ring 90. A rubber cushioning washer 93 is located between the pressure plate 92 and the reinforcing rings 90. Together the pressure plate 92 and cushioning washer 93 with the reinforcing rings 90 beneath are coaxially mounted on the punch rod 74.

Another C-clip washer 89 is provided at the lower end 78 of the punch rod 74. The lower C-clip 89 fits into the groove 83 of the punch rod 74. The pressure plate 92 is secured to the punch rod 74 immediately beneath the annular groove 83. The pressure plate 92 is thereby carried in reciprocal movement with the punch rod 74.

The pressure plate 92, cushioning ring 93, and reinforcing rings 90 are mounted on the lower end 78 of the punch rod 74, but above the punch plate 66. The punch rod 74 is moved longitudinally through the apertures 72, 70, and 68. The aperture 72 in the punch plate 66 is only large enough to permit passage of the punch rod 74 through the punch plate 72 of the casing 52. The punch rod 74 with the pressure plate 92, cushioning ring 93, and reinforcing rings 90 mounted thereon is moved up into position, as illustrated in FIG. 5 so that the reinforcing rings 90, cushioning ring 93, and pressure plate 92 are located beneath the intermediate partition 64. The pressure plate 92 is located directly beneath the intermediate partition 64 in facing relationship therewith and above the stack of reinforcing rings 90. The aperture 70 in the intermediate partition 64 is smaller in area than the outer diameter of the pressure plate 92.

When the punch rod 74 with the pressure plate 92 and reinforcing rings 90 mounted thereon is in position, as illustrated in FIG. 5, the coil spring 86 is compressed and the upper C-clip 88 is inserted laterally from the side. The C-clip 88 is engaged in the upper groove 80 at the upper end 76 of the punch rod 74. The outer diameter of the C-clip 88 is at least as great as the outer diameter of the coil spring 86.

Figure 9:
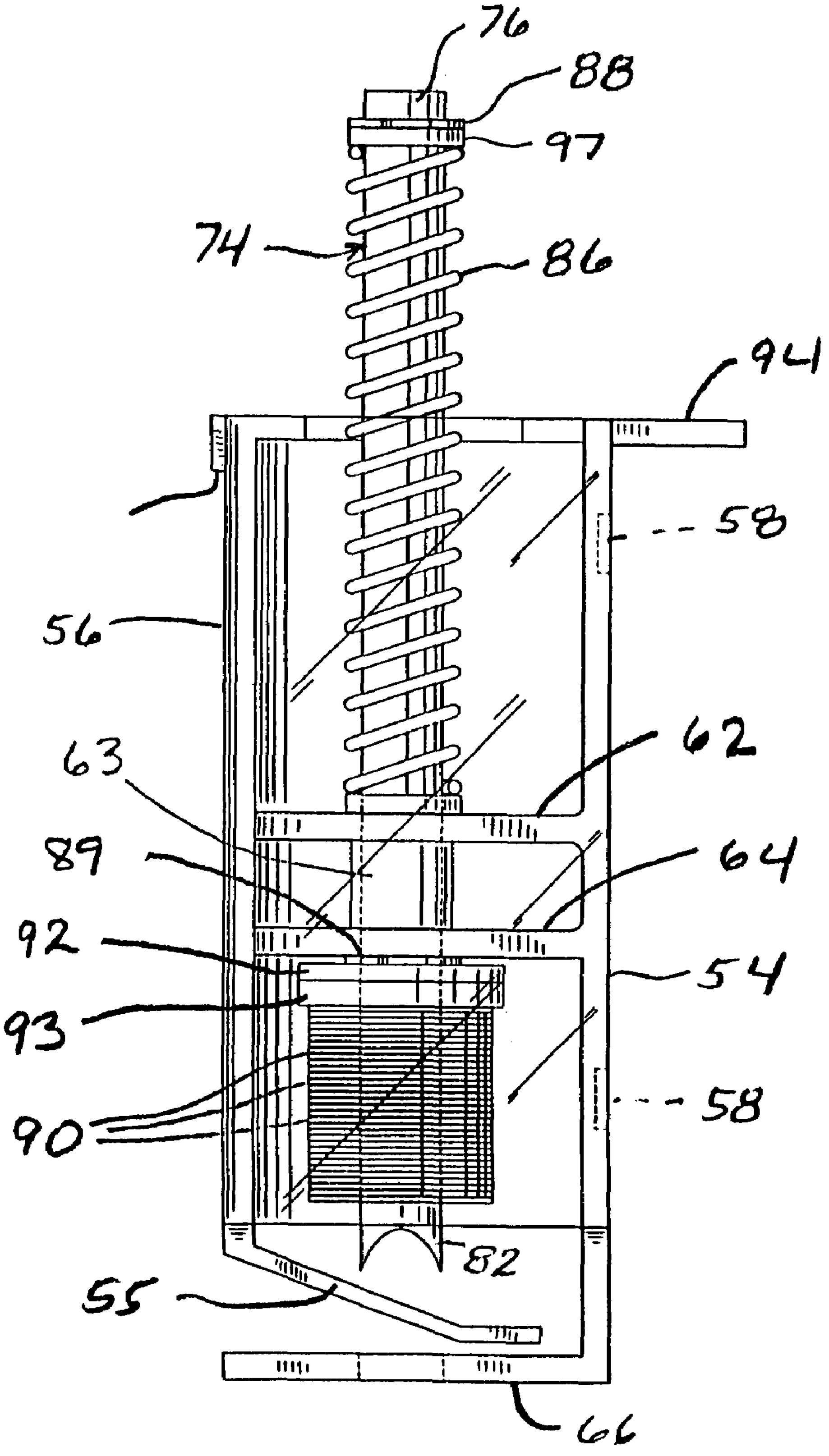
FIG. 9 is a sectional elevation view of the cartridge according to the invention, shown in isolation.

FIG. 9 illustrates the construction of the cartridge 50 in isolation. As shown, the upper portion 78 of the punch rod 74 extends above the upper partition 62. The spring 86 is also located above the upper partition 62. The spring 86 is thereby compressed between the upper C-clip 88 and the upper surface of the upper partition 62. The lower end of the spring 86 bears against a rigid washer 91 disposed atop the upper partition 62. The upper partition 62 is located quite close to the intermediate partition 64. A punch guide sleeve 95 is interposed in between the upper partition 62 and the intermediate partition 64.

Once the C-clip 88 has been engaged in the annular groove 80 of the punch rod 74 the coil spring 86 urges the upper end 76 of the punch rod 74 up through the top of the casing 52 until the pressure plate 92 presses against the undersurface of the intermediate partition 64 with the C-clip 89 interposed therebetween. The hood 56 is then engaged with the backplate 54 with the catch fingers 58 on the backplate 54 projecting into the catch-engaging openings 60 on the backside of the hood 56. The cartridge 50 is thereupon fully assembled and ready for use.

The hood 56 has a pair of downwardly inclined, arcuately curved arms 55 at its lower extremity. These arms are resilient in a longitudinal direction and serve to prevent the paper 12 from being drawn upwardly off the flat surface 22 of the base 18 when the spring 86 retracts the piston rod 74 upwardly. The gap between the arms 55 is sufficiently wide to permit passage of the reinforcing rings 90 therebetween.

Figure 6:
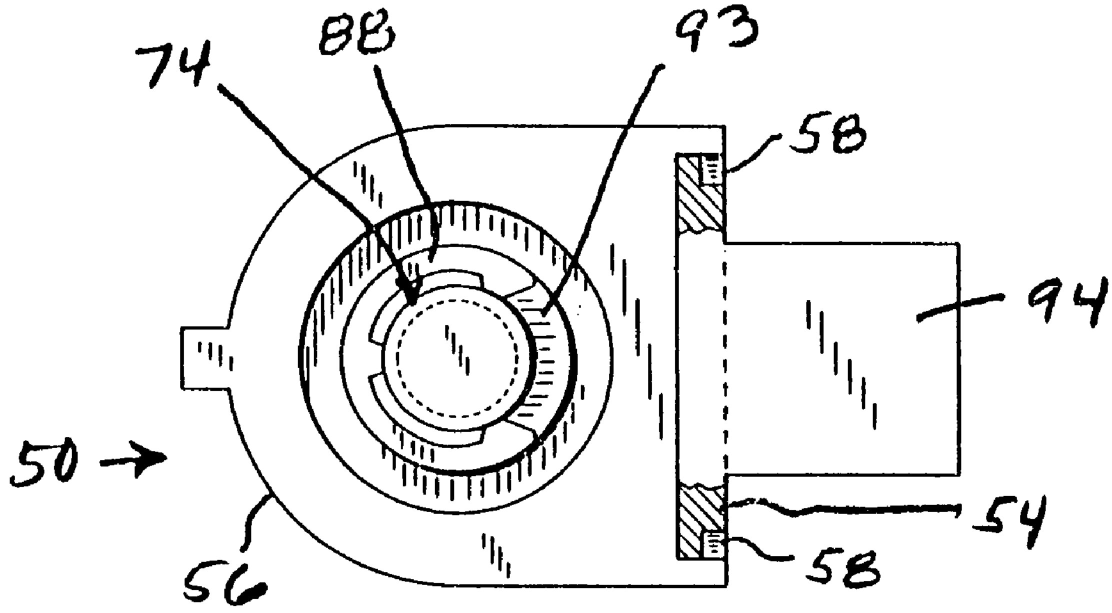
FIG. 6 is a top plan view of the cartridge of the invention shown from above in isolation, and partially broken away.

To insert the cartridge 50 into the hole puncher and reinforcer 10 the punch lever arm 32 is rotated up and away from the base 18 to the fully raised position clear of alignment with the socket 40 of the stanchion 16, as illustrated at 32' in FIG. 3. As illustrated in FIGS. 4 and 6, a rearwardly projecting lug or tang 94 projects laterally from the top of each backplate 54 at each stanchion position. In the embodiment illustrated, the lug 94 extends in a direction opposite the partitions 62 and 64 and the punch plate 66. As most clearly shown in FIGS. 1-3, the punch lever arm 32 is provided with hooks 96 projecting from its undersurface in alignment with all of the stanchions 16.

When the punch lever arm 32 is rotated upwardly to an approximately vertical orientation, as illustrated in phantom at 32' in FIG. 3, the cartridge 50 may be easily dropped down into the tubular socket 40, as is evident in FIG. 3. The punch plate 66 rests in a depressed pocket 23 in the base 18 with its upper surface in coplanar relationship with the deck surface 22 of the base 18. The punch lever arm 32 is then counter rotated in a counterclockwise direction opposite the directional arrow 98, thereby bringing a lever arm roller 41 into contact with the tip of the upper end 76 of the punch rod 74, as illustrated in FIG. 2. The hole puncher and reinforcer 10 is then ready for use.

In the ready position illustrated in FIG. 2 the lower end of the coil spring 86 presses downwardly against the upper side of the upper partition 62, while the upper end of the spring 86 bears against the C-clip 88 which serves to couple the spring 86 to the punch rod 74. The compressed coil spring 86 pushes upwardly on the C-clip 88, thereby pushing the upper end 76 of the punch rod 74 through the top of the casing 52. The tip of the upper end 76 of the punch rod 74 is forced upwardly against the roller 41 that protrudes from the underside of the punch lever arm 32. The transverse pressure plate 92 is thereby drawn upwardly until it bears against the underside of the intermediate partition 64. At the retracted position illustrated in FIG. 2 the lower end 78 of the punch rod 74 is drawn up into the lower compartment of the casing 52, above the level of the punch plate 66.

A sheet of paper 12 is then pushed into the gap between the lower edge of the front of the socket 40 and the deck surface 22 of the base 18. The sheet of paper 12 is pushed rearwardly until it is stopped by the backing plate 54.

To operate the hole puncher and reinforcer 10 the user pushes downwardly on the end of the lever arm 32 remote from the axle rod segments 34 in a counterclockwise direction as indicated by the directional arrow 100 in FIG. 2A. This force presses downwardly on the punch rod 74, forcing its lower end 78 through the aperture 72 in the punch plate 66 of the casing 52, and through the aperture 24 in the center of the depressed pocket 23. The gap between the paper hold down arms 55 is large enough to allow passage of the reinforcing rings 90 therebetween.

As the punch rod 74 is forced downwardly in the direction indicated by the directional arrow 100 in FIG. 2A, the cutting-edge 82 punches a circular opening in the sheet of paper 12 as it passes through the punch aperture 72 in the punch plate 66, thereby cutting a disk-shaped chad 104 therefrom, as illustrated in FIG. 2A. Concurrently, the pressure plate 92 presses forcefully downwardly on the stack of reinforcing rings 90, thereby forcefully pressing the lower surface of the lowermost reinforcing ring 90' against the upper surface of the sheet of paper 12 in the area surrounding the hole left by the chad 104. The lowermost reinforcing ring 90' will adhere to the sheet of paper 12, due to the presence of the pressure-sensitive adhesive on its undersurface. Chads 104 are thereby cut from the sheet of paper 12 and a reinforcing ring 90 is applied to the sheet of paper 12 about the openings left by each chad 104 at each stanchion location.

When the punch lever arm 32 is released, the coil spring 86 extends upwardly, pushing against the upper C-clip 88. This retracting force withdraws the punch rod 74 upwardly, carrying with it the pressure plate 92 and the reinforcing rings 90 remaining in the stack of reinforcing rings, as illustrated in FIG. 2B. The lowermost reinforcing ring 90' separates from the underside of the reinforcing ring 90 located immediately above it due to the presence of the release coating on the upper surface of the lowermost reinforcing ring 90'. The resilient paper hold down arms 55 keep the sheet of paper 12 from being pulled up along with the reinforcing rings remaining on the punch rod 74.

The concurrent punching and reinforcing process is repeated for different sheets of paper 12 until the supply of reinforcing rings 90 has been depleted, and no further reinforcing rings 90 are left to be attached to the sheet of paper 12 beneath the pressure plate 92. The user is able to observe the approximate number of reinforcing rings 90 remaining by looking through the slot 46 in the socket 40 and through the transparent hood 56 into the lower compartment of the cartridge 50. The user can thereby be prepared to eject a spent cartridge 50 and replace it with another one containing a fresh supply of retaining rings 90.

Once the last reinforcing ring 90 has been applied to a sheet of paper 12, the punch lever arm 32 is lifted to the position illustrated at 32' in FIG. 3. The lever arm 32 is moved in the direction indicated by the directional arrow 98. As the punch lever arm 32 is raised above the position illustrated in FIG. 2B and clear of the socket 40, each hook 96 on the underside of the lever arm 32 engages a lug 94 projecting rearwardly from one of the backplates 54, lifting upwardly on them, as shown in FIG. 3. This force concurrently lifts the cartridges 50 upwardly from the sockets 40 so that the spent cartridges 50 can be easily removed from the sockets 40 and replaced with fresh cartridges 50 which have already been preloaded with different punch rods 74 upon which fresh stacks of reinforcing rings 90 are carried.

Once a fresh cartridge 50 has been dropped down into the socket 40 and seated in the pocket 23, the punch lever arm 32 is rotated back downwardly from the position shown in FIG. 3 to the ready position of FIG. 2. The hole puncher and reinforcer 10 is then ready again for use.

Undoubtedly, numerous variations and modifications of the invention will become readily apparent to those familiar with hole puncher and reinforcement mechanisms. For example, the spring 86 need not necessarily be a coil spring and does not necessarily have to be located axially about the punch rod 74. Numerous different alternative spring arrangements are available for exerting an upward force on the punch rod 74.

Also, while the partitions 62, 64, and 66 have been illustrated with circular apertures 68, 70, and 72, respectively, the apertures need not be closed. Rather, a separate pair of forked fingers could be substituted for each of the partitions 62, 64, and 66. Also, the lower partition 66 can be omitted entirely, as it is not indispensable to the operation of the hole puncher and reinforcer.

Accordingly, the scope of the invention should not be construed as limited to the specific embodiment depicted and described, but rather is defined in the claims appended hereto.

I claim:

1. A hole puncher and reinforcer for punching holes in sheets of material and for concurrently applying reinforcement to said sheets of material about said holes comprising:

a base having a flat upper surface and at least one upright stanchion projecting upwardly from said base, a punch lever arm secured to said stanchion for rotation about an axis of rotation parallel to said flat upper surface, a cartridge removably attachable to said stanchion and detachable therefrom and including a hollow casing formed with upper and lower compartments that are longitudinally aligned with each other and with a die punch opening defined therein, a punch rod mounted to said casing in alignment with said die punch opening for longitudinal, reciprocal movement relative to said casing and for movement within said cartridge and into said die punch opening, a spring in said cartridge for biasing said punch rod to a raised, retracted position withdrawn from said base and for biasing said punch lever arm to a raised position, a transverse pressure plate rigidly secured to said punch rod and located in said lower compartment of said casing, a stack of reinforcing rings disposed coaxially upon said punch rod beneath said pressure plate and having lower surfaces with pressure-sensitive adhesive thereon and opposite, upwardly facing surfaces, wherein said stanchion forms a tubular socket having an opening defined therein and said punch lever arm is rotatable clear of alignment with said socket so that said cartridge is insertable into said socket from above, wherein said cartridge is provided with a lift latch and said punch lever arm is provided with a hook to engage said lift latch from beneath, whereby rotation of said punch lever arm away from said base once said cartridge is inserted into said socket engages said hook with said lift latch to lift said cartridge up from said base, whereby said punch lever arm is rotatable against the bias of said spring toward said base to press a lowermost one of said reinforcing rings forcefully into contact with a sheet of material located atop said base and concurrently drive said punch rod through said sheet of material and into said die receiving opening.

2. A hole puncher and reinforcer according to claim 1 wherein said tubular socket is formed with a longitudinal slot therein.

3. A hole puncher and reinforcer according to claim 1 further comprising at least a pair of laterally spaced sockets and cartridges as aforesaid.

4. A hole puncher and reinforcer according to claim 1 further comprising at least three laterally spaced sockets and cartridges as aforesaid.

5. A hole puncher and reinforcer according to claim 1 wherein a depressed pocket is formed in said flat upper surface of said base at each stanchion to seat a cartridge as aforesaid therein.

* * * * *